United States Patent [19]

Satake et al.

[11] Patent Number: 5,177,808
[45] Date of Patent: Jan. 5, 1993

[54] OPTICAL ENERGY BEAM TRANSMISSION PATH STRUCTURE

[75] Inventors: Takeshi Satake, Minoh; Tokuji Hayashi, Takarazuka; Masayoshi Hachiwaka, Itami; Masakatsu Kimura, Amagasaki; Koichi Suzuki, Suita; Takeji Akutsu, Amagasaki; Yoshimasa Tsukamoto, Kobe; Isao Shirasu, Akashi, all of Japan

[73] Assignees: Mitsubishi Jukogyo Kabushiki Kaisha; Mitsubishi Cable Industries, Ltd., Japan

[21] Appl. No.: 604,628

[22] Filed: Oct. 29, 1990

[30] Foreign Application Priority Data

| Nov. 2, 1989 | [JP] | Japan | 1-287212 |
| Nov. 2, 1989 | [JP] | Japan | 1-287213 |
| Nov. 2, 1989 | [JP] | Japan | 1-287214 |
| Nov. 2, 1989 | [JP] | Japan | 1-287215 |

[51] Int. Cl.⁵ .................................................. G02B 6/38
[52] U.S. Cl. ........................................ 385/98; 385/70
[58] Field of Search ............... 350/96.20, 96.21, 96.23; 385/95, 96, 97, 98, 99, 70

[56] References Cited

U.S. PATENT DOCUMENTS

| 4,140,366 | 2/1979 | Makuch et al. | 350/96.21 |
| 4,390,237 | 6/1983 | Marazzi | 385/85 X |
| 4,730,885 | 3/1988 | Doi | 350/96.21 |
| 4,737,011 | 4/1988 | Iri et al. | 350/96.20 |
| 4,890,897 | 1/1990 | Cook | 350/96.20 X |
| 4,953,938 | 9/1990 | Buhrer et al. | 350/96.21 X |
| 4,953,941 | 9/1990 | Takahashi | 350/96.21 X |
| 5,018,823 | 5/1991 | Himmelwright | 385/70 |

FOREIGN PATENT DOCUMENTS

| 0168261 | 1/1986 | European Pat. Off. | 350/96.21 |
| 2007867 | 5/1979 | United Kingdom | 350/96.2 |

OTHER PUBLICATIONS

Article on Monitoring Permanent-Magnet Motor Heating with Phosphor Thermometry by Stephen W. Allison published in Dec. 1988 in the IEEE Transactions on Instrumentation and Measurement Magazine vol. 37, No. 4.

Primary Examiner—John D. Lee
Assistant Examiner—Phan T. Heartney
Attorney, Agent, or Firm—Marks & Murase

[57] ABSTRACT

The present invention provides an optical energy beam transmission path structure comprising at least one pair of optical fibers each having a connection end, and at least one fiber connector for connecting the connection ends of the paired fibers substantially coaxially. A small axial air gap is formed between the connection ends of the paired fibers, and an annular clearance is formed immediately around the connection end of the glass body of each fiber.

19 Claims, 9 Drawing Sheets

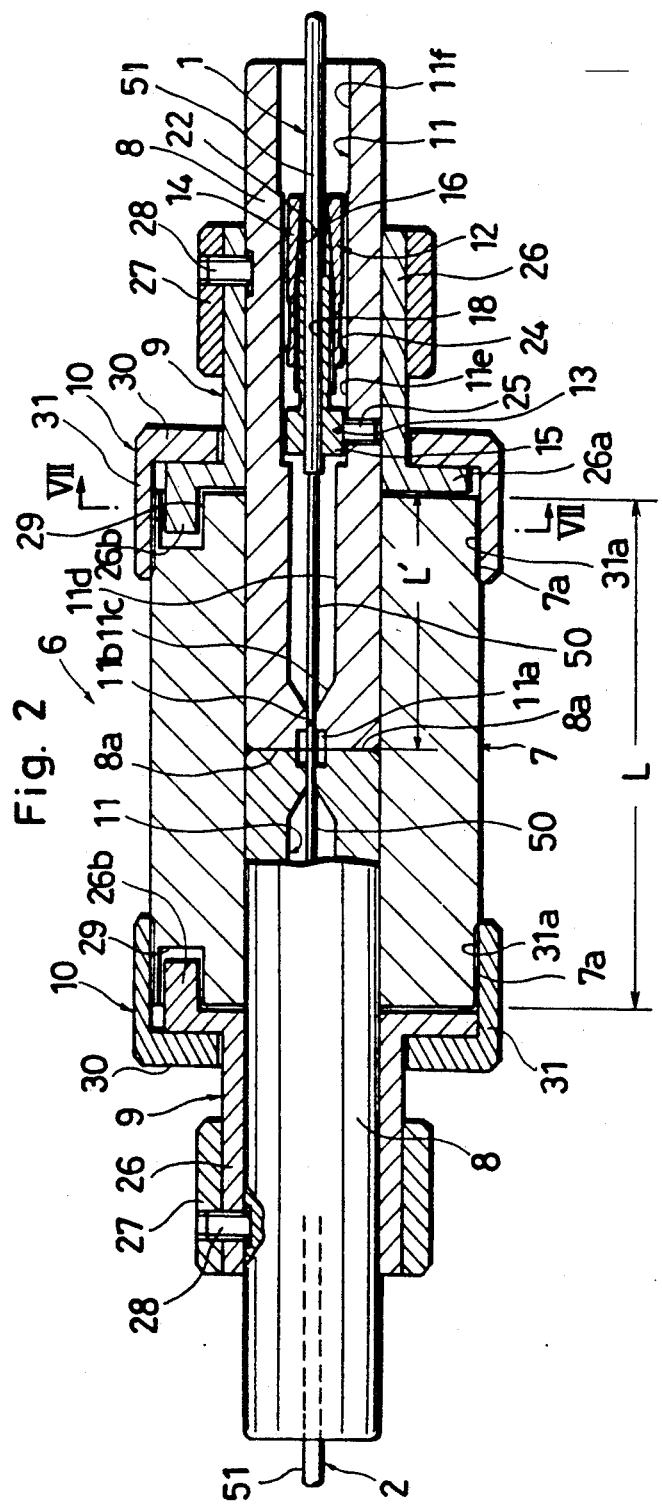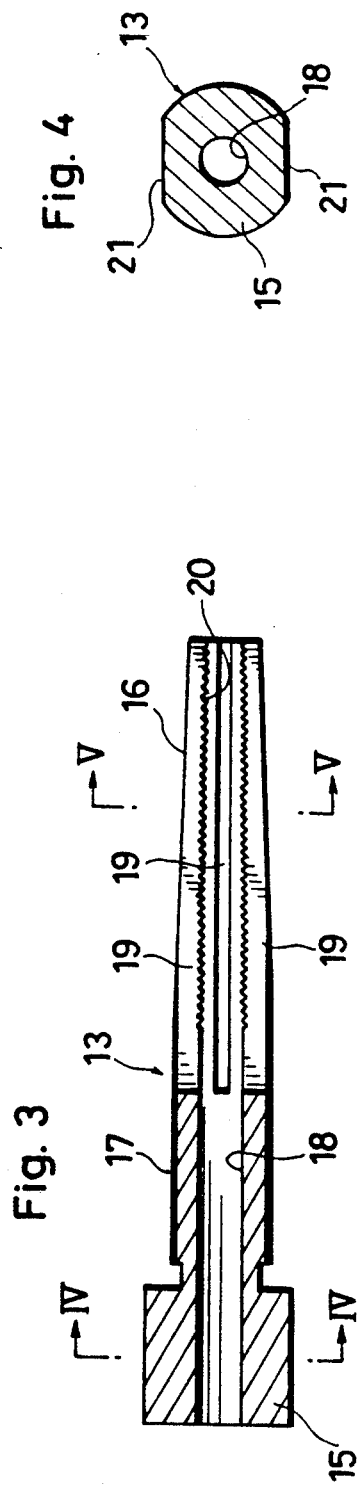

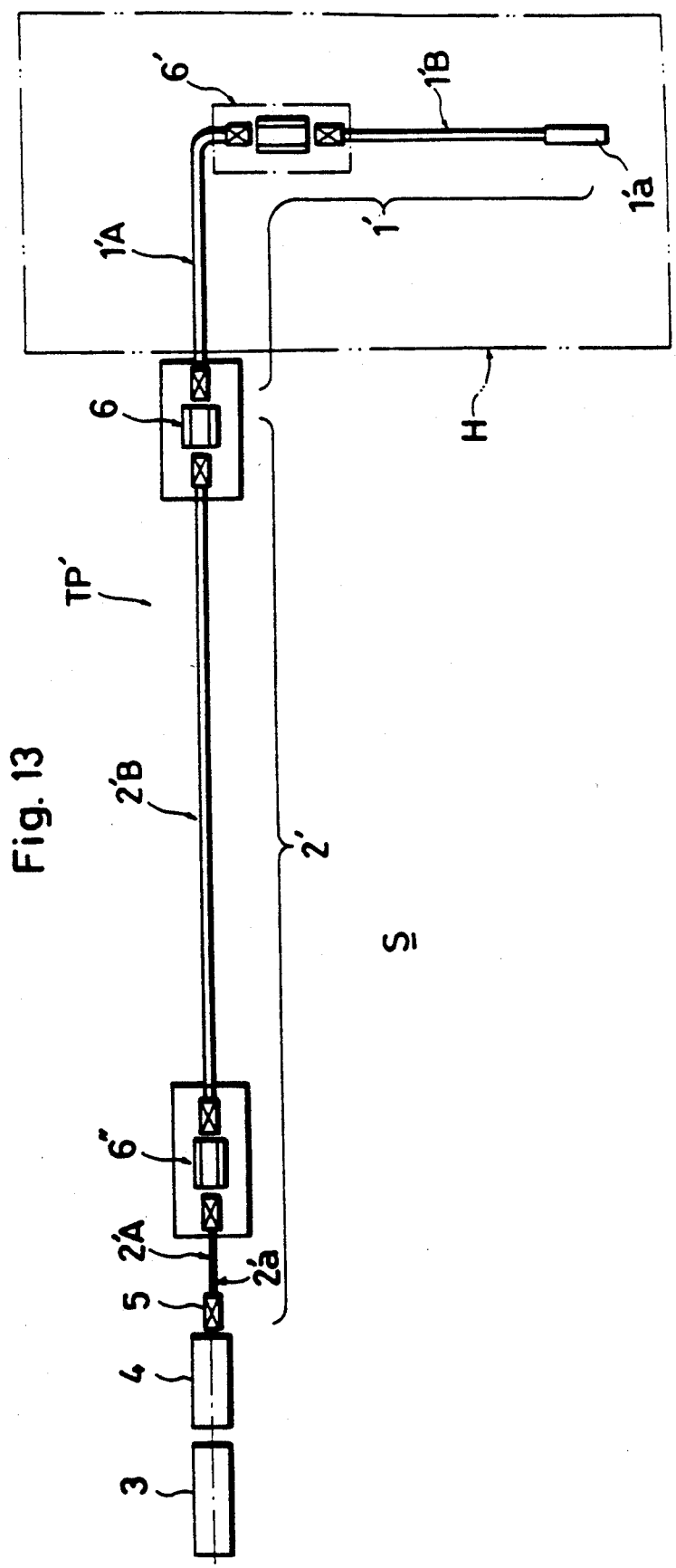

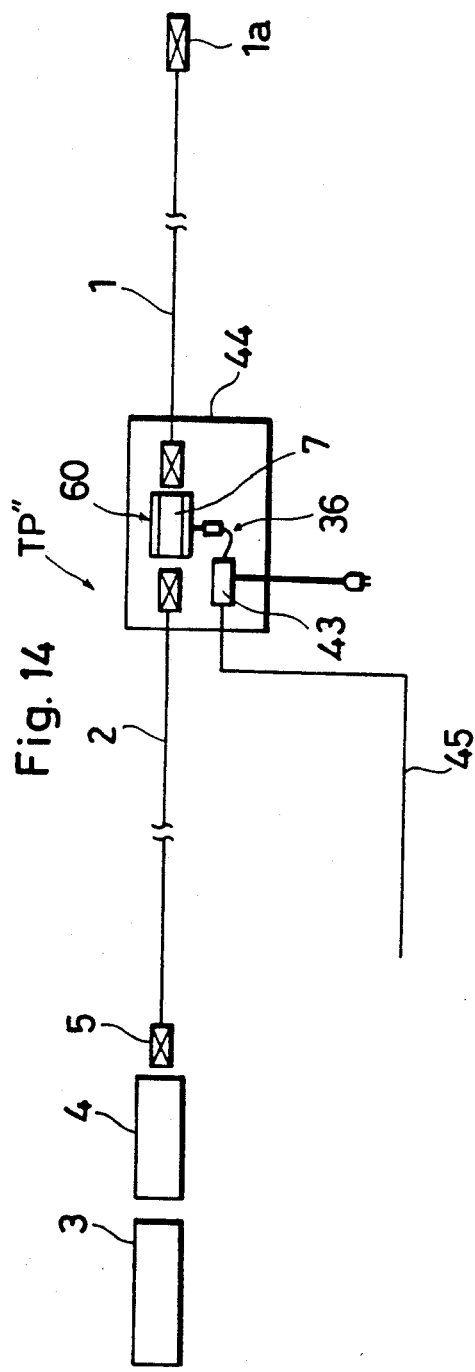
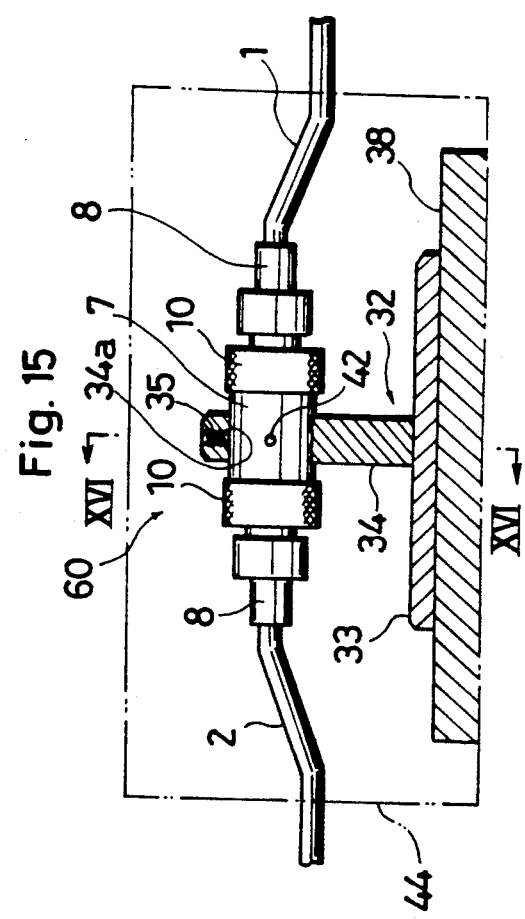

5,177,808

OPTICAL ENERGY BEAM TRANSMISSION PATH STRUCTURE

BACKGROUND OF THE INVENTION

1. Field of the Invention

This invention relates genearlly to beam transmission using fiber optics. More specifically, the present invention relates to a transmission path structure which is used to transmit an optical energy beam, particularly a laser beam, over a long distance.

The term "optical energy beam" as used herein means optical beams, particularly laser beams, the energy of which is large enough for use in industries such as for welding or soldering, or in medical treatment such as for cutting away the affected parts of the human body. Thus, this term does not include optical beams for communications.

2. Description of the Prior Art

As is well known, optical fibers comprise a glass body and a sheath enclosing the glass body. The glass body consists of an inner core and an outer clad which is different in reflactive index from the core, so that the light beam is trapped in the core for transmission substantially without leaking from the clad.

Generally, the glass body of the optical fiber used for transmitting an optical energy beam of $10^5$–$10^{10}$ W/cm$^2$ for example have a core diameter of 125–1,250 μm (the clad diameter being about 1.25 times the core diameter), and a length of up to about 200 m. Thus, for transmitting the optical energy beam for a distance beyond 200 m, it is necessary to connect a plurality of fibers by fusing for example. Apparently, such a manner of fiber connection is time-consuming.

When the optical fiber is used for transmitting an optical energy beam (laser beam), particularly the input end of the fiber is easily damaged in a short period because the fiber input end is directly subjected to incidence of the large-energy laser beam (e.g. $10^5$–$10^{10}$ W/cm$^2$). Once damaged, the fiber input end must be cut off to provide a new input end, and the optical components (optical coupler, incident lens, and etc.) associated with the damaged input end must be replaced or positionally readjusted. Obviously, such replacement and re-adjustment is really time-consuming and costly.

In transmitting an optical energy beam (laser beam) into a harmful region such as a radioactively contaminated region, a laser beam source must be located remote from the harmful region for the purposes of safety, and the optical fiber must be correspondingly elongated. In such an application, a portion of the fiber arranged within the harmful region is more likely damaged than the remaining portion. In spite of the fact that the fiber portion arranged within the harmful region is far shorter than the remaining fiber portion, the optical fiber must be replaced as a whole once the shorter fiber portion is damaged, thereby causing a great material loss and taking a lot of time for replacement. Alternatively, the damaged fiber portion may be cut off, and a new fiber portion is connected to the remaining fiber portion. However, such repair also takes a lot of time, necessitating an unacceptably long interruption of the work process (e.g. laser beam welding).

One way to overcome the problems described above is to use a fiber connector for removably connecting optical fibers. However, no practical cable connector has ever been developed which is applicable to optical energy beam transmission fibers.

For instance, an optical communication fiber connector having a pair of ferrules is not usable for optical energy beam transmission because of low light transmittance and/or unacceptable heat generation. Specifically, in such a fiber connector, the connection ends of the fibers are held in direct contact or slightly spaced apart with an intervening matching liquid filled therebetween. When the connection ends of the fibers are held in direct contact with each other, the connection end faces of the fibers are mechanically damaged (scratched at the time of contact, so that the light transmittance between the fibers lowers due to the mechanical damage. Further, a drop in the light transmittance results in corresponding light leakage which in turn is wasted as heat. On the other hand, the matching liquid has a nature of generating heat when transmitting a light beam, and such heat generation becomes particularly remarkable when transmitting an optical energy beam (large-energy laser beam).

SUMMARY OF THE INVENTION

It is, therefore, an object of the present invention to provide an optical energy beam transmission path structure which enables quick replacement of a damaged path portion alone while ensuring minimum heat generation and light transmission loss at a fiber connection or connections.

Another object of the present invention is to provide an optical energy beam transmission path structure including a fiber connector which enables quick connection and removal of optical fibers without using an adhesive.

A further object of the present invention is to provide an optical laser beam transmission path structure including a fiber connector which is capable of effectively dissipating heat even if heat is unexpectedly generated.

Still another object of the invention is to provide an optical energy beam transmission path structure including a fiber connector which enables monitoring of heat generation.

According to the present invention, there is provided an optical energy beam transmission path structure comprising: at least one pair of optical fibers each having a connection end; and at least one fiber connector for connecting the connection ends of the paired fibers substantially coaxially; wherein a small axial air gap is formed between the connection ends of the paired fibers; and an annular clearance is formed immediately around the connection end of each fiber.

Preferably, the fiber connector is supported by a stand, and the connector and the stand are equally made of a metal which has a good heat transmission. Further, the fiber connector may be provided with a means for measuring the temperature at the connection between the paired fibers.

Other objects, features and advantages of the present invention will be fully understood from the following detailed description given with reference to the accompanying drawings.

BRIEF DESCRIPTION OF THE DRAWINGS

In the accompanying drawings:

FIG. 2 is a view, in longitudinal section, showing a fiber connector incorporated in the path structure;

FIG. 3 is an enlarged view, in longitudinal section, showing a male member of a fiber holder incorporated in the fiber connector;

FIG. 4 is a sectional view taken along lines IV—IV in FIG. 3;

FIG. 13 is a schematic overall view showing another optical energy beam transmission path structure according to the present invention;

FIG. 14 is a schematic overall view showing a further optical energy beam transmission path structure according to the present invention;

FIG. 15 is an enlarged view showing a fiber connector incorporated into the path structure of FIG. 14;

DETAILED DESCRIPTION OF THE PREFERRED EMBODIMENTS

Figure 1:
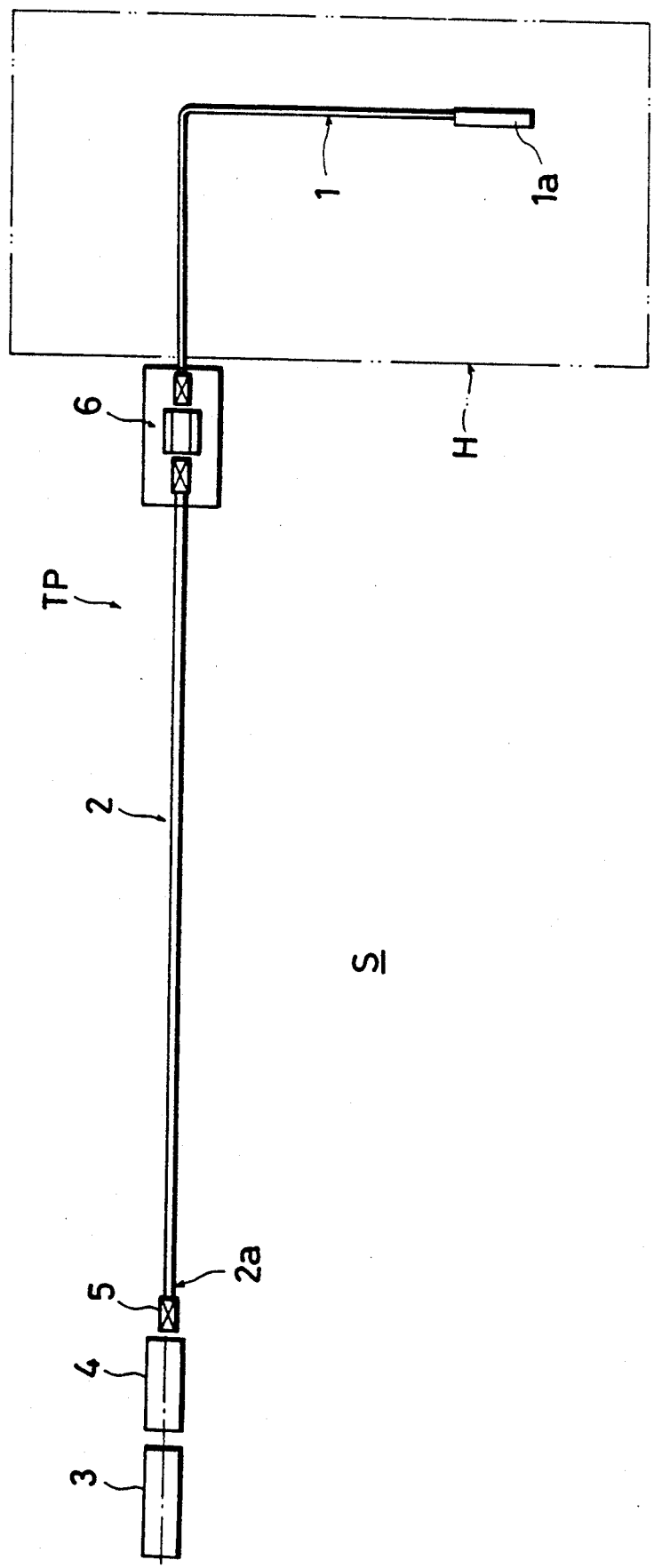
FIG. 1 is a schematic overall view showing an optical energy beam transmission path structure according to the present invention.

Referring first to FIG. 1 of the accompanying drawings, an optical energy beam transmission path structure TP according to the present invention is shown as arranged to guide the energy beam (laser beam) from a safe or normal region S into a harmful or dangerous region H which, for example, is radioactively contaminated or subjected to toxic gas generation. Of course, the entirety of the beam transmission path structure may be arranged in the safe region.

The optical energy beam is generated by an optical beam source 3 arranged in the safe region S. A suitable example of the beam source is a YAG laser generator which is capable of generating a laser beam of 1 watt to several kirowatts. Between the beam source and the beam transmission path structure TP is disposed an incident optical system 4 close to and coaxial with the beam source.

The beam transmission path structure TP comprises a first optical fiber 1 and a second optical fiber 2. The first fiber is mostly arranged within the harmful region H, and has an output end 1a. The second fiber is disposed in the safe region S, and has an input end 2a which is provided with an optical coupler 5 close to and coaxial with the incident optical system 4. The first and second fibers are connected together by means of a fiber connector 6 which is located in the safe region but close to the harmful region.

Each of the first and second optical fibers 1, 2 includes a glass body 50, and a sheath 51 enclosing the glass body. Though not specifically shown, the glass body 50 consists of a core and a clad, conventionally.

As shown in FIG. 2, the fiber connector 6 comprises a cylindrical adaptor 7, and a pair of ferrules 8 inserted into the adaptor respectively from the opposite ends thereof. One ferrule is provided for the first fiber 1, whereas the other ferrule is used for the second fiber 2. The fiber connector further comprises a pair of mounters 9 associated with the respective ferrules, and a pair of cap nuts 10 associated with the respective mounters. The mounters and the cap nuts are used for fitting the corresponding ferrules to the adaptor 7, as described later.

Each of the ferrules 8 has an axial bore 11. This axial bore includes a circular tip opening 11a, a constricted portion 11b following the tip opening, and a conical portion 11c following the constricted portion. The remainder of the axial bore 11 is generally cylindrical but stepped to provide a smaller diameter portion 11d following the conical portion 11c, an intermediate portion 11e following the smaller portion, and a larger diameter portion 11f subsequent to the intermediate portion.

Each of the first and second fibers 1, 2 is held inserted into the corresponding ferrule 8 by means of a fiber holder 12 fitted in the intermediate portion 11e of the axial bore 11. The holder comprises a male member 13 and a female member 14.

Figure 5:
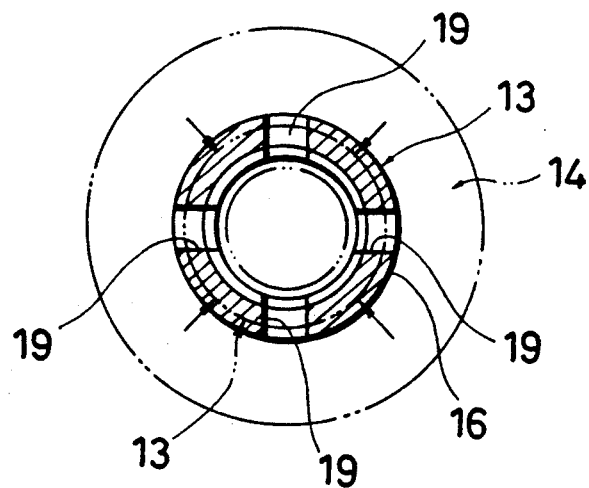
FIG. 5 is a sectional view taken along lines V—V in FIG. 3.

As shown in FIGS. 3 through 5, the male member 13 of the fiber holder 12 is generally cylindrical, and has an enlarged head 15 at one end closer to the center of the fiber connector 6 (see FIG. 2). The other end of the male member is formed with a tapered outer surface 16 which gently reduces in diameter away from the enlarged head 15. An externally threaded portion 17 is formed between the tapered surface and the enlarged head.

The male member 13 further has an axial bore 18 for receiving the corresponding fiber sheath 51 (see FIG. 2). The cylindrical wall of the male member is formed with longitudinal slits 19 equiangularly spaced at an interval of e.g. 90° and extending from the tapered end toward the enlarged head 15. Preferably, a portion 20 of the axial bore 18 corresponding to the tapered outer surface 16 is roughened as by threading. Indicated at 21 (FIG. 4) are flat surfaces of the enlarged head 15.

Figure 6:
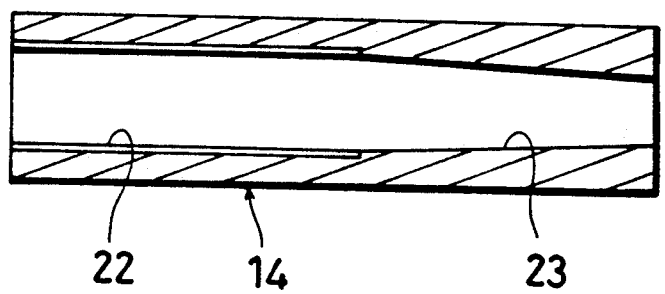
FIG. 6 is an enlarge view, in longitudinal section, showing a female member of the fiber holder.

As shown in FIG. 6, the female member 14 is also cylindrical, and has an internally threaded portion 22 at one end for engagement with the externally threaded portion 17 of the male member 13. The female member further has a tapered inner surface 23 complementary to the tapered outer surface 16 of the male member. Preferably, the female member may be formed with a non-circular portion 24 (see FIG. 2) for facilitating turning thereof as by a wrench.

The provision of the longitudinal slits 19 makes the axial bore 18 of the male member 13 to be diametrically reducible, as indicated by phantom lines in FIG. 5. Thus, when the female member 14 is fitted onto the male member and screwably advanced toward the enlarged head 15, the tapered surfaces 16, 23 of the male and female members interact with each other to cause diametrical reduction of the axial bore 18, thereby chucking the fiber sheath 51, as shown in FIG. 2. Obviously, the roughened portion 20 of the male member engages the fiber sheath 51 to ensure firm fixation thereof.

As shown in FIG. 2, the fiber holder 12 can be fixed in place within the intermediate bore portion 11e of the corresponding ferrule 8 by means of a stud 25 screwed transversely in the cylindrical wall of the ferrule into engagement with the enlarged head 15 of the male member 13. On the other hand, when the stud is loosened, the fiber holder can be removed out of the ferrule bore 11 together with the retained fiber.

Obviously, the purpose of providing the roughened portion 20 on the male member 13 is to prevent axial deviation of the retained fiber. Thus, such a roughened portion may be provided by any means other than threading. Examples include serrating and rough-grinding.

The longitudinal slits 19 of the male member 13 are provided for enabling diametrical reduction of the male member bore 18. Thus, the longitudinal slits may be provided in any number. Indeed, one such slit suffices for the intended function.

As shown in FIG. 2, each of the mounters 9 comprises a cylindrical main body 26 fittable on the corresponding ferrule 8. The mounter further comprises a cylindrical sub-body 27 fitted on the main body and fixed thereto by a stud 28. The stud 28 also engages the ferrule 8 to releasably fix the mounter 9 axially relative to the ferrule.

Figure 7:
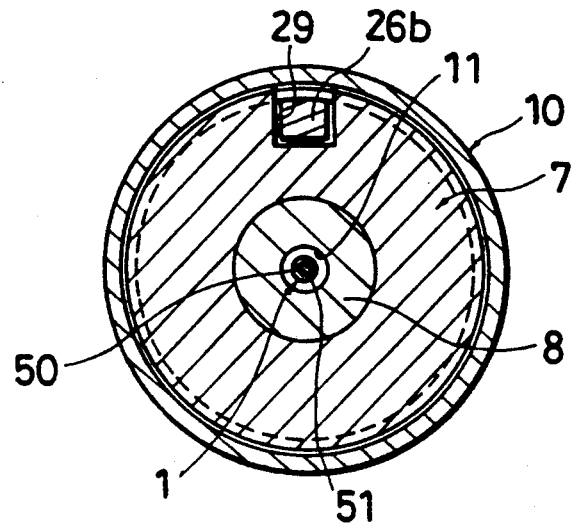
FIG. 7 is a sectional view taken along lines VII—VII in FIG. 2.

The main body 26 of the mounter 9 has an end flange 26a located away from the sub-body 27. As illustrated in FIGS. 2 and 7, the end flange 26a is integrally formed with a projection 26b. This projection is received in a blind hole 29 formed in the corresponding end of the adaptor 7. Thus, when assembled, the mounter 9 together with the ferrule 8 held thereby is non-rotatable relative to the adaptor 7.

Each of the cap nuts 10 is fitted on the corresponding mounter 9. The cap nut has an end wall 30 which comes into pressing contact with the end flange 26a of the mounter. The cap nut further has a cylindrical wall 31 which is formed with an internally threaded portion 31a for engagement with an externally threaded portion 7a at the corresponding end of the adaptor 7. Thus, when the cap nut is screwed to the adaptor, the mounter 9 is held axially fixed to the adaptor together with the ferrule 8.

Each ferrule 8 projects axially inward from the corresponding end flange 26a of the corresponding mounter 9 by a length L' (FIG. 2) which is slightly larger than half the length L of the adaptor 7. As a result, it is always ensured that the front (inner) end face 8a of the ferrule 8 comes into contact with the front end face of the counterpart ferrule when the nut 10 is tightened up for assembly.

Each of the fibers 1, 2 is retained by and extends through the fiber holder 12 within the axial bore 11 of the ferrule 8. The glass body 50 of the fiber is exposed by removing the fiber sheath 51 in the portions 11a, 11b, 11c, 11d of the ferrule axial bore 11.

Figure 8A:
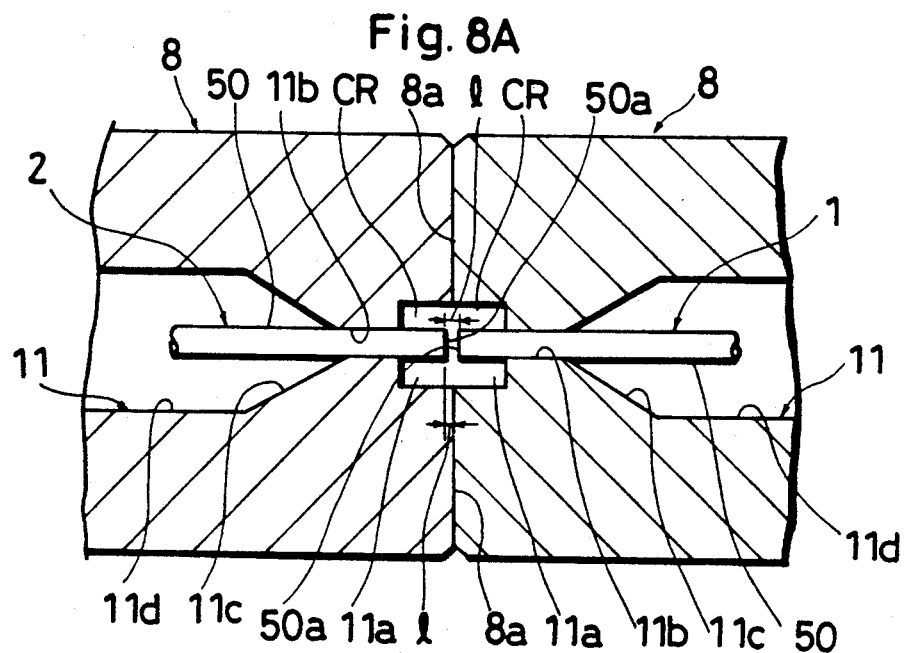
FIG. 8A is an enlarged sectional view showing a fiber connecting portion within the fiber connector.
Figure 8B:
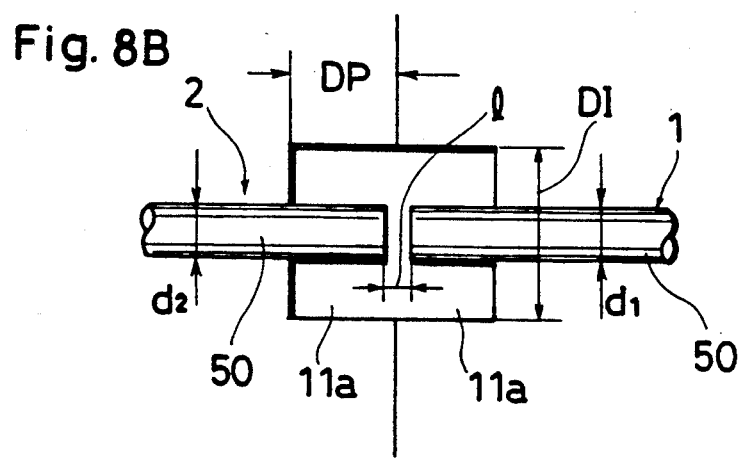
FIG. 8B is an enlarged view, on even larger scale, showing the fiber connecting portion.

As shown in FIGS. 8A and 8B, the exposed glass bodies 50 of the respective fibers 1, 2 have their connection end faces 50a opposed to each other with an axial air gap 1 when the respective ferrules 8 are held in contact with each other. For this purpose, each of the connection end faces is slightly retreated from the front end face 8a of the corresponding ferrule 8 by an amount l' which is half the air gap l. More concretely, the retreating amount l' is set at 1-50 μm for example, so that the gap l between the connection end faces 50a is 2-100 μm.

The first and second fibers 1, 2 (together with the pair of ferrules 8) are held coaxial with each other within a strict offset tolerance of up to 0.02 mm. Otherwise, the beam transmittance between these fibers unacceptably deteriorates.

Strict coaxiality is thus required between each ferrule 8 and the adaptor 7. For this purpose, the ferrule must be intimately fitted into the adaptor, so that considerable abrasion may take place to deteriorate the coaxiality after repetitively inserting the ferrule into the adaptor if no countermeasure is provided against such abrasion. Preferably, therefore, the adaptor 7 may be designed to have a double structure (not shown) which includes an inner cylinder made of a harder metal (abrasion-resistant metal) such as stainless steel for receiving the ferrule, and an outer cylinder made of a softer metal such as aluminum or copper. Alternatively, the adaptor may be made entirely of a single metal such as steel, and subjected to surface-treatment such as alumitization to have a harder inner cylindrical surface for receiving the ferrule.

Within the circular tip opening 11a of the axial bore 11 of each ferrule 8, there is formed an annular clearance CR around the exposed fiber glass body 50. Such an annular clearance is effective in preventing heat generation at the fiber connection, as hereinafter described.

It is now assumed that the diameter and depth of the circular tip opening 11a of the axial bore of each ferrule 8 are represented respectively by DI and DP (see FIG. 8B), whereas the clad diameters of the glass bodies 50 of the first and second fibers 1, 2 are designated respectively by $d_1$ and $d_2$. These parameters are preferably set to meet the following formulas.

$$DI \geq 2d_1$$

$$DI \geq 2d_2$$

$$10.0 \text{ mm} \geq DP \geq 1.0 \text{ mm}$$

Thus, when $d_1 = d_2 = 0.75$ mm for example, preferably DI=2 mm and DP=2 mm. There is no upper limit for the diameter DI of the circular tip opening 11a. Obviously, however, the diameter of the tip opening must be less than the outer diameter of the ferrule 8, so that the maximum value of the diameter DI of the tip opening 11a is self-limitative.

Figure 9:
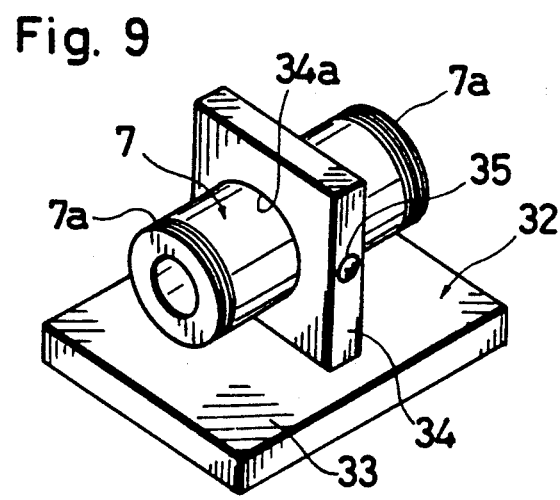
FIG. 9 is a perspective view showing a stand for the fiber connector.

As shown in FIG. 9, the adaptor 7 of the fiber connector 6 may be mounted to a stand 32 which comprises a base plate 33 and a vertical plate 34 upstanding from the base plate. The vertical plate 34 has a mounting hole 34a in which the adaptor 7 is inserted. Fixing of the adaptor is achieved by a bolt 35 screwed to the vertical plate 34 into engagement with the adaptor.

The stand 32 works as a heat sink for the adaptor 7 of the fiber connector 6 in addition to providing good anchoring for the latter. Thus, the stand as well as the adaptor and the ferrules 8 should be preferably made of a metal which is excellent in heat transmission. Examples of suitable metallic materials include copper, aluminum, brass and stainless steel.

The first and second optical fibers 1, 2 are connected together by means of the fiber connector 6 in the following manner.

First, each fiber is inserted through the male member 13 of the corresponding fiber holder 12, and the female member 14 is screwed on the male member. As a result, the axial bore 18 of the male member is diametrically reduced to hold the fiber.

Then, the fiber holder 12 is inserted into the intermediate bore portion 11e of the corresponding ferrule 8, so that the exposed glass body 50 projects into the tip opening 11a of the ferrule. Subsequently, the stud bolt 25 is advanced into engagement with the enlarged head 15 of the male member 13. Thus, the fiber is axially fixed relative to the ferrule. At this time, compressed air is applied to the ferrule tip opening 11a to completely remove dust or any other impurities from the tip opening 11a (or the annular clearance CR) and the connection end of the exposed glass body 50.

Finally, the ferrule 8 is inserted into the adaptor 7, and the cap nut 10 is screwed onto the corresponding threaded portion 7a of the adaptor until the ferrule comes into end-to-end contact with the counterpart ferrule. In this way, the fiber is axially fixed relative to the adaptor 7, and connected to the other fiber.

The above manner of fiber connection is advantageous in the following respects.

(1) The fiber holder 12 relies on diametrical reduction of the axial bore 18 of the male member 13, so that the fiber holder is applicable to fibers of various diameters. Further, the diametrical reduction of the male member ensures quick chucking and removing of the fiber.

(2) Fixation of the fiber holder 12 together with the retained fiber is achieved easily and quickly simply by screwing the stud bolt 25 without using an adhesive which requires a certain curing time but yet fails to provide subsequent adjustment and removal. Further, the use of an adhesive provides a problem in thermal resistance.

(3) The provision of the roughened portion 20 reliably prevents the fiber from axial deviation, so that the axial position of the fiber relative to the other fiber can be held always constant.

(4) The optical axes of the two fibers 1, 2 can be exactly aligned simply by inserting the ferrules 8 into the adaptor 7. Thus, it is possible to save the time (by about one hour) which has been conventionally required for axis alignment in a lens connection system.

When damaged, the fiber may be taken out for replacement simply by screwably removing the corresponding cap nut 10. The damaged fiber together with the associated fiber holder 12, ferrule 8, mounter 9 and cap nut 10 may constitute a unit which is replaceable by a new unit. In fact, such replacement can be achieved in about 10-20 seconds. In this way, it is possible to minimize the interruption of operation. Obviously, the damaged fiber alone may be subsequently separated to enable re-use of the remaining parts (cable holder 12, ferrule 8, mounter 9 and cap nut 10) after the replacement.

According to the arrangement shown in FIG. 1, the first fiber 1 is more likely damaged than the second fiber 2 because the former is arranged in the harmful region H. When actually damaged, the first fiber can be quickly removed from the fiber connector 6 and left in the harmful region (because of radioactive contamination for example). A replacement first (not shown), which may be arranged in advance in the harmful region or brought subsequently to the site of replacement, is then coupled to the fiber connector 6 to resume the interrupted operation. Thus, the second fiber 2, which assumes a major length portion of the overall beam transmission path structure TP, can be used in combination with the replacement first fiber without itself being replaced, consequently reducing the interruption time and contributing greatly to material saving.

As already described, the first and second fibers 1, 2 are connected in a manner such that their respective connection end faces 50a are opposed to each other with the small air gap l (see FIG. 8A). Despite the presence of such an air gap, the light transmittance between the two fibers can be maintained at an acceptably high level. To explain this, reference is now made to FIG. 10 which graphically illustrates the result of an experiment conducted for the optical energy beam transmission path TP shown in FIG. 1.

In the experiment, the beam transmission path TP was entirely arranged in the safe region S. The first fiber 1 and a length of 5 m with the core diameter of its glass body 50 being 700 $\mu$m (clad diameter $d_1 = 875$ $\mu$m), whereas the second fiber 2 had a length of 200 m with the core diameter of its glass body being 600 $\mu$m (clad diameter $d_2 = 750$ $\mu$m). The diameter DI and depth DP of the circular tip opening 11a were both 2 mm. The air gap l was 50 $\mu$m. The optical beam source 3 was a YAG laser generator which was made to generate a laser beam of progessively increasing power.

Figure 10:
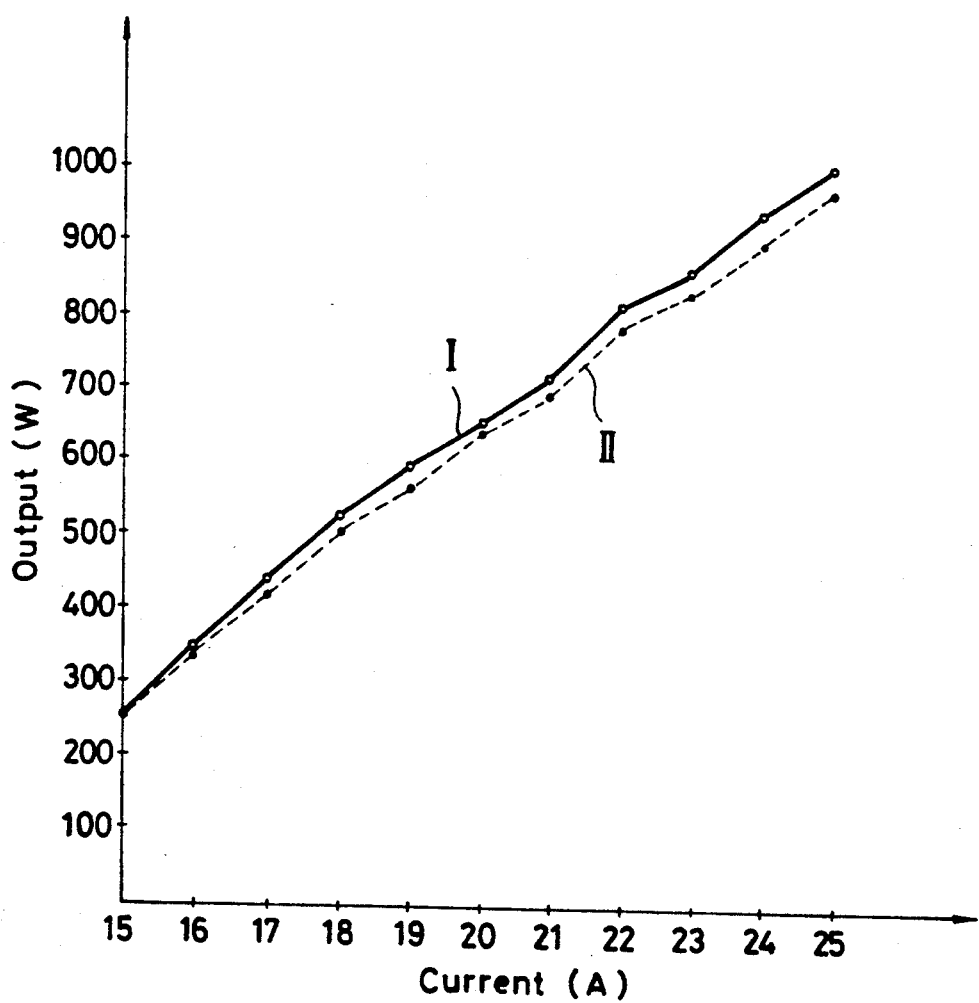
FIG. 10 is a graph showing the output characteristics of the transmission path according to the present invention.

In FIG. 10, the ordinate represents the current in ampare at the YAG laser generator 3, while the abscissa represents the laser output in watt. The curve I shows the output at the connection end face 50a (see FIG. 8A) of the second fiber cable 2, whereas the curve II shows the output at the output end 1a (see FIG. 1) of the first fiber cable 1. Thus, the difference between the curves I and II represents a loss in laser beam transmission between the two fiber cables 1, 2.

From FIG. 10, it is clearly appreciated that the beam transmission loss between the two fibers 1, 2 is significantly small even if there is a small air gap l between the respective connection end faces 50a.

Figure 11:
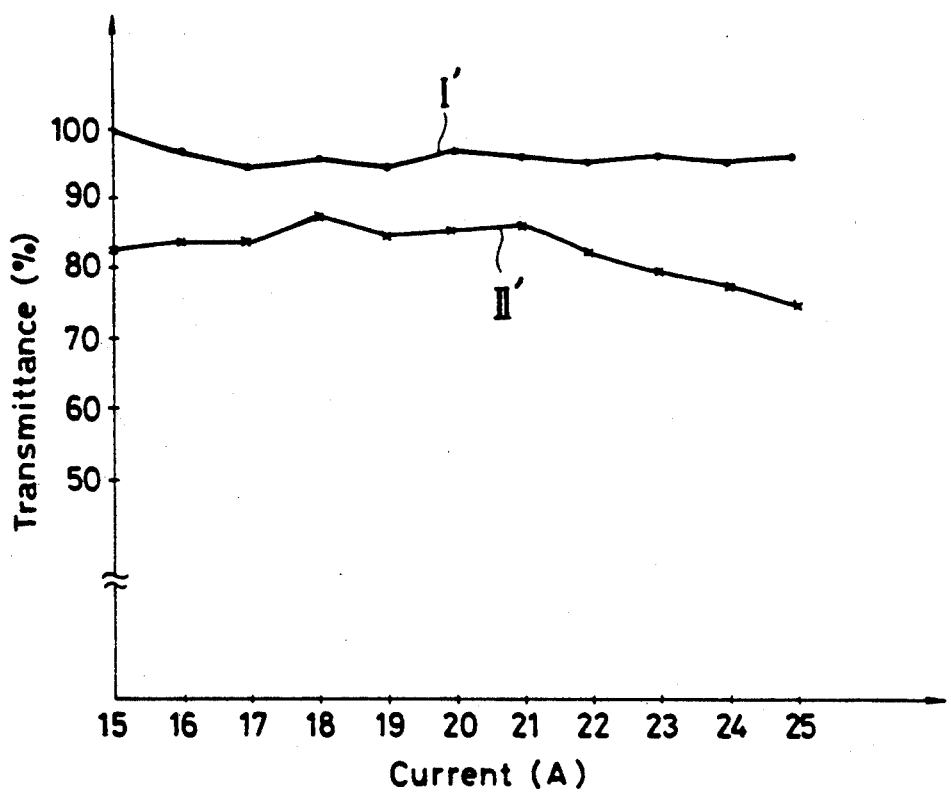
FIG. 11 is a graph showing the light transmission characteristics of the transmission path.

FIG. 11 is a graph which shows the light transmittance in percentage between the two fibers 1, 2. In FIG. 11, the curve I' represents the light transmittance which is the ratio between the curves I and II in FIG. 10. For comparison, the curve II' of FIG. 11 shows the light transmittance obtained when connecting two fibers by a conventional lens connection system.

From FIG. 11, it is appreciated that the light transmittance obtainable by the inventive fiber connector 6 is always 95% or higher, whereas the light transmittance obtainable by the conventional lens connection is less than 90%. It should be pointed out that the inventive fiber connector 6 (the core diameter of the first fiber glass body being 600 $\mu$m and the core diameter of the second fiber glass body being 700 $\mu$m) is substantially free of heat generation, whereas the conventional lens connection is accompanied by unacceptable heat generation.

Figure 12:
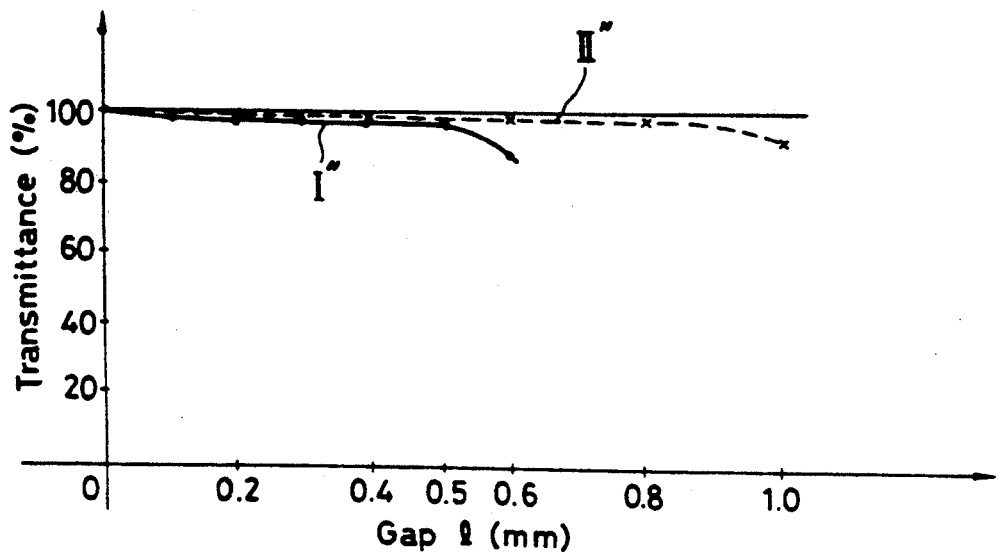
FIG. 12 is a graph showing how the light transmittance varies when an axial air gap between the connected fibers changes.

FIG. 12 is a graph showing how the light transmittance varies when the air gap l (see FIGS. 8A and 8B) is changed but the output of the YAG laser generator 3 (see FIG. 1) is maintained constant at 1 KW. In FIG. 12, the curve I" represents the light transmittance variation obtained when the glass bodies 50 of the first and second fibers 1, 2 equally have a core diameter of 600 $\mu$m (clad diameter $d_1$, $d_2 = 750$ $\mu$m). On the other hand, the curve II" represents the light transmittance variation obtained when the glass body of the first fiber 1 has a core diameter of 700 $\mu$m (core diameter $d_1 = 875$ $\mu$m), whereas the glass body of the second fiber 2 has a core diameter of 600 μm (core diameter $d_2 = 750$ μm).

As appreciated from FIG. 12, the light transmittance remains nearly 100% until the air gap l increases up to about 0.5 mm when the glass bodies of the first and second fibers 1, 2 are equal in core diameter (curve I''). As also appreciated from FIG. 12, the light transmittance remains nearly 100% until the air gap l increases up to about 0.8 mm when the glass body of the first fiber 1 is larger in core diameter than the glass body of the second fiber 2. It is thus concluded that an acceptable degree of light transmittance is obtainable even if the air gap l varies over a wide range. However, a close inspection of FIG. 12 reveals that the smaller the air gap l, the higher the light transmittance. Therefore, the air gap should be preferably limited to 1–100 μm to prevent a light transmission loss to the maximum extent, as already described.

It should be mentioned in connection with FIG. 12 that the light transmittane is lower when the first and second fibers 1, 2 are equal in core diameter than when the first fiber is larger in core diameter than the second fiber (compare the curve I'' with the curve II''). Obviously, a lower light transmittance results in a larger light transmission loss which causes heat generation. In fact, with the first and second fibers being equal in core diameter, the cable connector is heated to 50° C. when the air gap l is 0.6 mm. According to the present invention, however, the air gap is much smaller than 0.6 mm, so that no problem occurs with respect to heat generation. Further, as long as heat generation is limited to a low level, the connector stand 32 (FIG. 9), which works as a heat sink, can dissipate the generated heat to prevent an unacceptable temperature elevation.

According to present invention, the connection end faces 50a of the first and second fibers 1, 2 are slightly spaced to provide the small air gap l. Despite the presence of such an aî gap, the light transmittance between the two fiber cables does not deteriorate, as clearly shown by FIGS. 10–12. Indeed, a lower light transmittance will result when the two fibers are held in direct end-to-end contact because the connection end faces 50a of the fibers are mechanically damaged at the time of direct contact.

Further, according to the present invention, the annular clearance CR is formed within the circular tip opening 11a of each ferrule 8 immediately around the corresponding fiber body 50, as shown in FIGS. 8A and 8B. Such as annular clearance has been found to effectively prevent or reduce heat generation for the reasons described below.

First, when there is no annular clearance around the fiber body 50 of the optical fiber, the tip opening 11a of the ferrule axial bore 11 has a diameter equal to that of the constricted bore portion 11b and the fiber glass body 50. Thus, when the glass body is inserted into the thus sized tip opening for assembly, the environmental dust is unremovably held trapped between the intimately mating surfaces of the glass body and the tip opening. On the other hand, a small portion of the laser beam passing through the glass body 50 inevitably leaks radially thereof. Thus, the trapped dust in burnt away by the leaking portion of the laser beam, consequently generating combustion heat. Such heat generation has been experimentally found to occur most likely near the fiber connection. The provision of the annular clearance CR enables complete dust removal from the tip opening 11a and the glass body 50 therein by applying compressed air after insertion of the glass body into the ferrule 8 but before insertion of the ferrule into the adaptor 7, so that no dust burning occurs due to the leaking portion of the laser beam.

Second, when the laser beam exitting from the second fiber 2 enters into the first fiber 1, a small portion of the laser beam is reflected on the connection end face 50a of the first fiber 1. The reflected beam portion impinges and heats the ferrule bore surface. Obviously, the degree of heating by such beam reflection is higher when the ferrule bore surface is located closer to the point of reflection. Thus, the annular clearance CR ensures that the position of heating is located remote from the point of beam reflection to minimize the degree of heat generation.

FIG. 13 shows a modified optical energy beam transmission path structure TP' according to the present invention. The modified path structure comprises a first path portion 1' arranged in the harmful region H, and a second path portion 2' disposed in the safe region S. The first and second path portions are removably connected together by means of a first fiber connector 6 located in the safe region close to the harmful region. The first fiber connector may be identical in configuration to the one previously described.

The first path portion 1' includes a first optical fiber 1'A removably coupled to the first fiber connector 6, and a second optical fiber 1'B providing an output end 1'a. The first and second fibers are removably coupled together by means of a second fiber connector 6' which may be identical in configuration to the first fiber connector 6.

The second path portion 2' includes a third optical fiber 2'A having an input end 2'a provided with an optical coupler 5 for receiving the laser beam from the beam source 3 through the incident optical system 4. The second path portion further includes a fourth optical fiber 2'B removably coupled to the first fiber connector 6. The third and fourth fibers are removably coupled together by means of a third fiber connector 6'' which may be identical in configuration to the first and second fiber connectors 6, 6'.

The length of the first and second path portions 1', 2' as well as the length of the individual fibers 1'A, 1'B, 2'A, 2'B may be optionally selected depending on the particular applications and/or operating conditions. In general, however, the second path portion 2' in the safe region S is sufficiently longer than the first path portion 1' in the harmful region H. The length of the first and second fibers 1'A, 1'B may be preferably in the range of 2–5 m for example. The length of the third fiber 2'A may be preferably in the range of e.g. 1–8 m, whereas that of the fourth fiber 2'B, which is rarely damaged, may be preferably in the range of e.g. 20–300 m.

According to the modification shown in FIG. 13, the overall transmission path structure TP' is constituted by the four fibers 1'A, 1'B, 2'A, 2'B. Of these fibers, the first and second fibers 1'A, 1'B are disposed in the harmful region H and therefore more likely damaged than the third and fourth fibers 2'A, 2'B. Further, the second fiber 1'B is more likely damaged than the first fiber 1'A because the output end 1'a of the second fiber is opposed to a workpiece (not shown) and therefore exposed to heat reflection or other influences of the work process (sputtering, etc.). Similarly, the third fiber 2'A is more likely damaged than the fourth fiber 2'B because the third fiber must receive direct incidence of the optical energy beam.

The first fiber connector 6 enables quick and easy separation between the first and second path portions 1', 2', namely between the first and fourth fibers 1'A, 2'B. The second fiber connector 6' allows quick and easy replacement of the second fiber 1'B independently of the first fiber 1'A. The third fiber connector 6" permits facilitated replacement of the third fiber 2'A separately from the fourth fiber 2'B. Thus, the modification of FIG. 13 is advantageous in that it reduces the cable length requiring replacement.

Obviously, the overall transmisson path structure TP' may be constituted by a larger number of fibers than illustrated. Conversely, the first path portion 1' may be rendered continuous by omitting the second fiber connector 6', or the second path portion 2' may be made continuous by omitting the third fiber connector 6". Further, the first fiber connector 6 may be located exactly at the boundary between the safe and harmful regions S, H, or in the harmful region H close to the safe region S.

FIG. 14 shows another modified optical energy beam transmission path structure TP" according to the present invention. This modification mainly differs from the embodiment of FIG. 1 in that a fiber connector 60 connecting the first and second fibers 1, 2 is provided with a temperature measuring device 36. The first fiber 1 may be arranged in a harmful region. Alternatively, the entirety of the transmission path structure TP" may be arranged in a sefe region.

Figure 16:
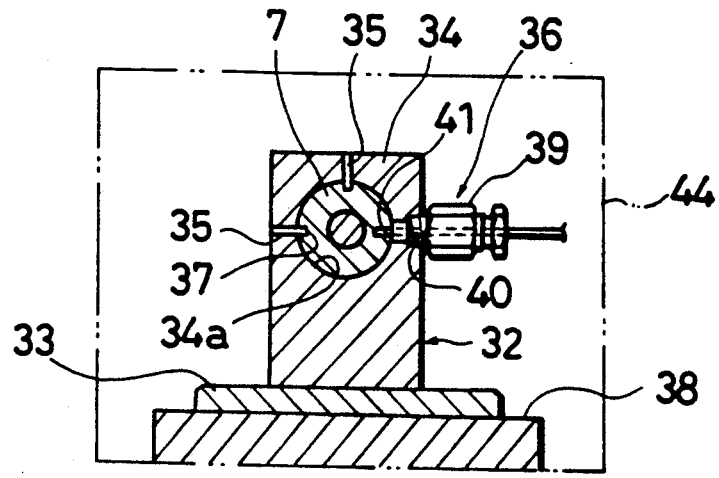
FIG. 16 is a sectional view taken along lines XVI—XVI in FIG. 15.
Figure 17:
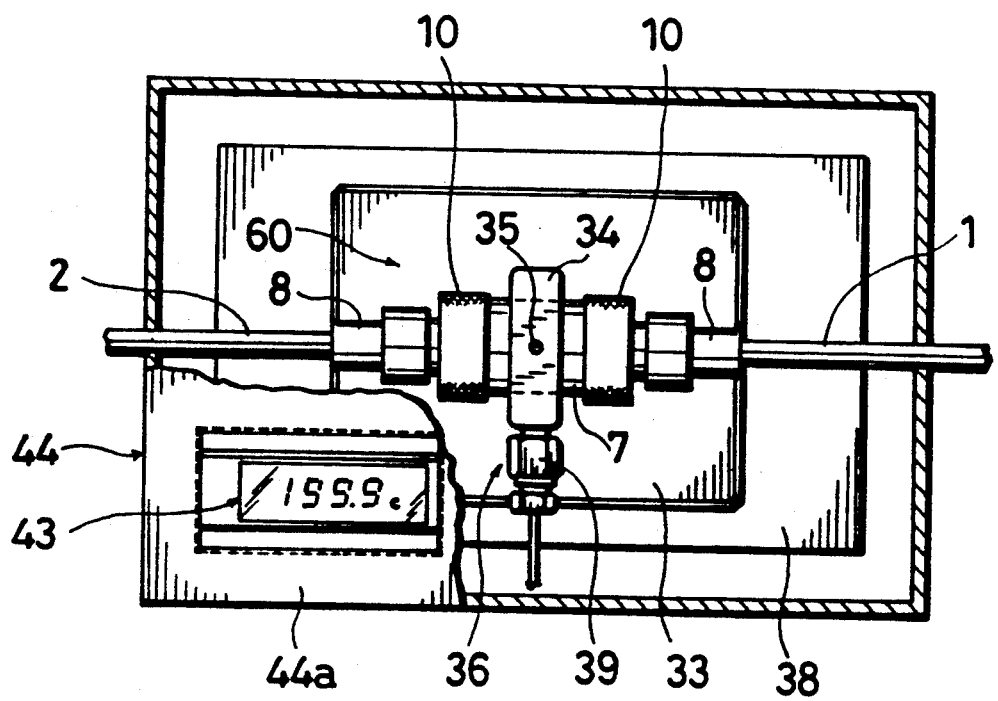
FIG. 17 is a plan view showing the fiber connector of FIG. 15.

As shown in FIGS. 15 through 17, the adaptor 7 of the fiber connector 60 is supported by a stand 32 which includes a base plate 33 and a vertical plate 34. The adaptor is received in a mounting hole 34a of the vertical plate and fixed therein by means of radially extending bolts 35. Preferably, the adaptor is externally formed with recesses 37 into which the bolts 35 engage. The base plate of the stand may be anchored on a stand support 38.

In the illustrated embodiment, the temperature measuring device 36 is in the form of a sleeved thermocouple mounted to the vertical plate 34 of the stand 32. For this purpose, the thermocouple is provided with a mount fitting 39 which is screwed into a threaded bore 40 of the stand vertical plate 34.

The thermocouple 36 has sleeve 41 (FIG. 16) inserted into a radial detection bore 42 (FIG. 15) or the adaptor 7. Thus, the thermocouple is capable of detecting the temperature of the fiber connector 60 where the first and second fibers 1, 2 are connected.

The output of the thermocouple 36 is fed to a digital display 43 provided on a top wall 44a of box 44 for visually indicating the detected temperature. The output of the thermocouple may be also fed to an external location through a line 45 (FIG. 14) to enable remote monitoring of the temperature.

If the temperature indicated at the digital display 43 or monitored at a remote place rises to an abnormal level during operation, the beam source 3 may be immediately deenergized to interrupt the operation. Thus, the fibers 1, 2 can be prevented from being damaged. Further, the temperature can roughly indicate the degree of fiber deterioration, thereby providing an estimate for the suitable timing when the fibers subsequently need be replaced.

While a single thermocouple is provided in the modification shown in FIGS. 14 to 17, a plurality of such thermocouples may be mounted to the vertical plate 34 of the stand 32. Further, the illustrated thermocouple may be replaced by a different type of temperature measuring device such as resistance thermometer or radiation thermometer. Moreover, the output of the temperature measuring device may be utilized to actuate an alarm when the detected temperature exceeds a preset value.

The present invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

We claim:

1. An optical energy beam transmission path structure comprising: at least one pair of optical fibers each having a glass body with a connection end; and at least one fiber connector for connecting the connection ends of the paired fibers substantially coaxially in directly facing relation; the fiber connector including a pair of ferrules in which the paired fibers are respectively held inserted, the paired ferrules respectively having front ends held in contact with each other;

wherein the front end of each ferrule is formed with a tip opening in which the connection end of a corresponding fiber glass body is located, the connection end of the corresponding fiber glass body being slightly retreated into the tip opening so that a small axial air gap is fomed between the connection ends of the paired fibers when the respective front ends of the paired ferrules are held in contact with each other, the tip opening being diametrically larger than the corresponding fiber glass body to form an annular clearance immediately around the connection end of the corresponding glass body.

2. A path structure as defined in claim 1, wherein the fiber connector further comprises an adaptor in which the paired ferrules are respectively held inserted.

3. A path structure as defined in claim 2, wherein the adaptor and the ferrules are made of a metal having good heat transmission.

4. A path structure as defined in claim 3, wherein said metal is selected from a group consisting of copper, aluminum, brass and stainless steel.

5. A path structure as defined in claim 2, wherein said adaptor is held by a stand which is made of a metal having good heat transmission.

6. A path structure as defined in claim 5, wherein said metal is selected from the group consisting of copper, aluminum, brass and stainless steel.

7. A path structure as defined in claim 1, wherein the fiber connector comprises a pair of fiber holders each of which includes a male member and a female member, the male member having:
   an externally threaded portion;
   an axial bore in which a corresponding fiber is held inserted, the axial bore being roughened at a surface portion close to one end of the male member;
   at least one longitudinal slit extending from said one end of the male member to an intermediate portion thereof; and
   a tapered outer surface located close to said one end of the male member and progressively reducing in diameter toward said one end; the female member having:

an internally threaded portion for engagement with the externally threaded portion of the male member; and a tapered inner surface complementary to the tapered outer surface of the male member; whereby when the female member is screwably advanced on the male member, the axial bore of the male member is diametrically reduced to chuck the fiber.

8. A path structure as defined in claim 7, wherein the roughened surface portion of the axial bore of the male member is provided by threading.

9. A path structure as defined in claim 1, wherein the fiber connector is provided with a means for measuring the temperature at the connection between the paired fibers.

10. A path structure as defined in claim 9, wherein the temperature measuring means comprises a thermocouple.

11. A path structure as defined in claim 1, wherein the path structure has an input end located in a safe region for allowing entry of an optical energy beam generated by an optical energy beam source, the path structure further having an output end located in a harmful region.

12. A path structure as defined in claim 11, wherein the fiber connector is located in the safe region close to the boundary between the safe region and the harmful region.

13. A path structure as defined in claim 11, wherein the path structure includes not less than three optical fibers connected in series by a plurality of fiber connectors each located between each adjacent two fibers, one of the fiber connectors being positioned in the safe region close to the boundary between the safe region and the harmful region.

14. A path structure as defined in claim 13, wherein another of the fiber connectors is located in the safe region close to the input end of the path sturcture.

15. A path structure as defined in claim 13, wherein another of the fiber connectors is located in the harmful region.

16. A path structure as defined in claim 11, wherein the optical energy beam source is a YAG laser generator.

17. A path structure as defined in claim 1, wherein the annular clearance has a depth not les than 1 mm, the annular clearance further having a diameter not less than double the diameter of the fiber glass body.

18. A path structure as defined in claim 1, wherein said small gap is 2 $\mu$m–100 $\mu$m.

19. A path structure as defined in claim 1, wherein the paired fibers are substantially coaxial with an offset clearance of up to 0.02 mm.

* * * * *